May 14, 1935. R. G. THOKE 2,001,371
CONFECTION
Filed March 28, 1933
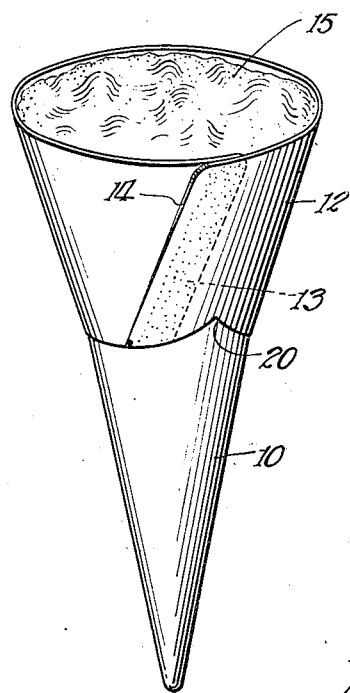
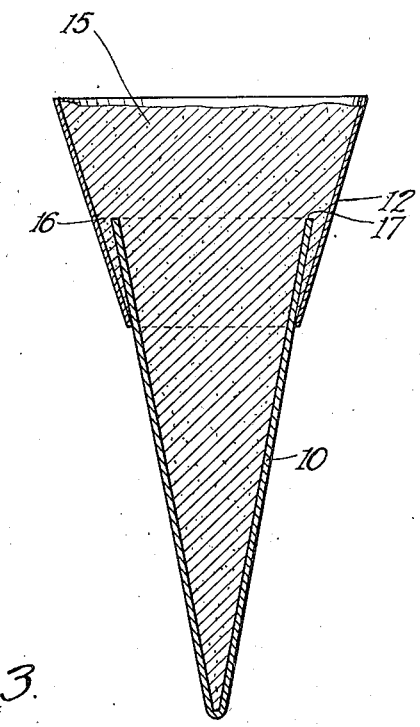
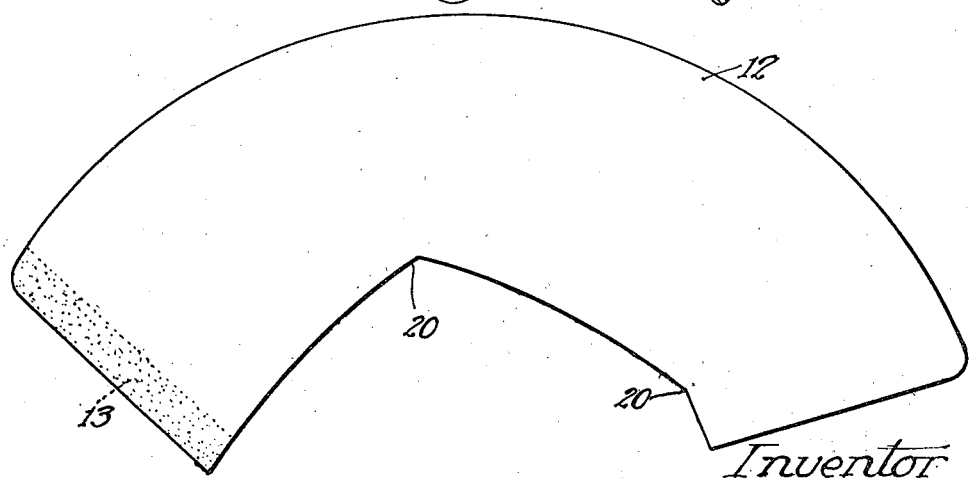
Inventor
Rudolph G. Thoke.
By: Fisher, Clapp, Soans & Pond
Attys.

Patented May 14, 1935

2,001,371

UNITED STATES PATENT OFFICE 2,001,371

CONFECTION

Rudolph G. Thoke, La Grange, Ill., assignor to Hydrox Corporation, Chicago, Ill., a corporation of Delaware Application March 28, 1933, Serial No. 663,152

7 Claims. (Cl. 99—16)

My invention relates to confections and has to do more particularly with an improvement in the field of ice-cream cones.

The ice-cream cone formed of frangible cake-like edible material has become an article of commerce which is substantially standard in shape and size, for the reason that this shape and size have been found capable of being packed and shipped with the least loss from breakage of all the various edible containers which have been tried. This standard cone is of a definite taper, which taper must be comparatively small in order to permit grasping of the cone securely by a very small child, since the sale of ice-cream cones is, to a large extent, confined to children.

With the change in economic conditions, there has been an insistent demand for more ice-cream in a cone for a given price, and attempts have been made to satisfy this demand in various ways. One well-known expedient is the so-called "Jumbo" type of cone, in which the ice-cream is piled up to overflowing above the edge of the cone, but this is open to the objection that the melting ice-cream tends to drop off or run down the side of the cone and fall upon the clothing of the consumer. Various attempts have also been made to change the shape of the cone to provide integral overhanging flanges, trays, etc. on which the ice-cream may be heaped, but such devices are subject to several objections. The loss from breakage is considerably increased, inasmuch as such devices cannot be packed nearly so conveniently as the ordinary simple straight-sided cone; furthermore, when ice-cream is piled up on such devices, the integral lip or tray, being frangible like the main body of the cone and bearing the major portion of the strain, tends to break, thus resulting in the loss of a large part of the ice-cream and annoyance to the consumer.

With these various defects of the prior art in mind, I have provided a device which satisfies the demand above referred to for a container whereby increased quantities of ice-cream may be dispensed without the objectionable features above mentioned. According to my invention, a simple cone of standard size and shape is used in conjunction with a simple and inexpensive auxiliary device of infrangible material which may be packed and shipped separately from the cones, in flat or collapsed form.

Referring now to the drawing forming a part of this specification and illustrating a preferred embodiment of my invention:—

Fig. 1 is a perspective view of my improved confection, in the condition in which it is dispensed to the consumer.

Fig. 2 is a longitudinal sectional view thereof, and

Fig. 3 is a developed plan view of the auxiliary device used in the combination

The numeral 10 represents an edible cone, which may be of the well-known standard shape, size, and composition, and may be formed of the usual frangible cake. The numeral 12 represents an auxiliary frusto-conical member formed preferably of paper or similar inexpensive collapsible material. This member may be formed from a blank as shown in Figure 3, the edges of which are joined by adhesive 13 in such manner as to leave a lip 14 free to be grasped by the fingers. The blank is preferably cut along its inner edge to provide notches as at 20, 20, in order to make a tight joint with the cake cone. Various other materials may be used in lieu of paper, such as glassine, etc., the principal feature being that this member is of inexpensive material and may be packed and shipped in collapsed, flat condition wherein it occupies a minimum of space.

The numeral 15 represents a filling of ice-cream, water-ice, or other frozen confection. It will be noted that the filling 15 preferably entirely fills the cake cone 10, occupies the space 16 between said cone and the auxiliary frusto-conical member 12, and overlies the edge 17 of the cone so as to form a bond between the cone and the annular segment of ice-cream disposed in the space 16.

In the preparation of the article of confection, the auxiliary device 12 is placed in position on the edible cone 10, as shown in the drawing, and may, for quantity production, be seated in a suitable tray or rack. The ice-cream is poured in semi-fluid condition so as to occupy the spaces as shown in Figure 2, whereupon the article is placed in a hardening room and cooled to a very low temperature, preferably around minus 20° F. The ice-cream thus is frozen to an extremely hard condition.

The article of confection thus produced may be transported under refrigeration without danger of breakage, even if a large number of such articles are piled together, since the cake cone is supported by the solid body of ice-cream within. Such support and strengthening of the cake material is enhanced by the fact that the ice-cream, when in semi-fluid condition, to a certain extent enters the pores of the cake on the inside of the cone, and, freezing in said pores, tends to make the cake hard and rigid, in which condition it strongly resists breakage. However, the cake is not soggy, since the outer portion thereof is still frangible, for the reason that the ice-cream is hardened before the cake can become saturated.

It will be obvious that the auxiliary sheet 12 is removed by the consumer before the confection is eaten, or may be removed before the article is dispensed, the free lip 14 being provided for this purpose. The overhanging portion 16 of ice-cream will not tend to drop off because it is bound to the central portion of the ice-cream by the interlocking portion extending over the edge 16 of the cone, and also because it has solidified in the pores of the cone, thus giving it a tooth furnishing an additional lock. Furthermore, the outer "ring" of ice-cream will not melt very rapidly because the inside of the cone is full of ice-cream, thus providing a substantially solid body of cold material to which warm air can have access only on the outside.

Various changes and modifications will doubtless suggest themselves to those skilled in the art without departing from the spirit of my invention. Hence, I do not wish to be limited to the specific embodiment shown and described except to the extent indicated in the appended claims, which are to be interpreted as broadly as the state of the art will permit.

I claim as my invention:

1. As a new article of manufacture and in combination, a cone formed of edible frangible material, an auxiliary frusto-conical separate member formed of infrangible and inedible sheet material arranged adjacent the upper portion of said cone with one edge contacting closely therewith, so as to define an inverted frusto-conical space in prolongation of the space within said cone, and a frozen comestible substantially filling said cone and said member, said comestible having been solidified therein.

2. A combination as defined in claim 1, wherein said auxiliary member has a greater taper than that of said cone and defines a substantially annular space outside the upper portion of said cone, said cone, said annular space and said frusto-conical member being filled with said comestible which is frozen to form a substantially unitary body.

3. A combination as defined in claim 1, wherein said cone is formed of porous material and said frozen comestible extends into the pores sufficiently to strengthen said cone.

4. A combination as defined in claim 1, wherein said cone is formed of frangible cake and said auxiliary member is formed of paper.

5. A method of producing a confection, comprising arranging on the upper portion of a frangible cake cone an auxiliary frusto-conical member of infrangible, inedible sheet material defining a space in prolongation of that within said cone, the lower edge of said auxiliary member closely contacting with the outer wall of said cake cone, filling said cone and said member with a comestible in semifluid condition, and promptly freezing said comestible to a hard condition to form an integral unit from which said auxiliary member may be stripped to leave a completely edible article.

6. In combination, a cake cone, a frusto-conical sheet member snugly fitting said cone to form an extension thereof, and a body of frozen comestible filling said cone and said extension and frozen to the interior walls of said members so as to bind said extension to said cone.

7. In combination, a cake cone, a frusto-conical collar of relatively weak non-rigid sheet material snugly fitting said cone to form an extension thereof, and a body of frozen comestible filling said cone and said extension and frozen to the interior walls of said members so as to bind said extension to said cone.

RUDOLPH G. THOKE.